US006711934B2

(12) United States Patent
Barbe

(10) Patent No.: US 6,711,934 B2
(45) Date of Patent: Mar. 30, 2004

(54) CHEMICAL DISPENSING SYSTEM

(75) Inventor: David J. Barbe, Winterville, NC (US)

(73) Assignee: U.N.X. Incorporated, Greenville, NC (US)

(*) Notice: Subject to any disclaimer, the term of this patent is extended or adjusted under 35 U.S.C. 154(b) by 0 days.

(21) Appl. No.: 10/197,197

(22) Filed: Jul. 17, 2002

(65) Prior Publication Data

US 2003/0056565 A1 Mar. 27, 2003

Related U.S. Application Data

(62) Division of application No. 09/695,114, filed on Oct. 24, 2000, now Pat. No. 6,434,772.

(51) Int. Cl.[7] .......... G01L 27/00
(52) U.S. Cl. .......... 73/1.59; 137/597
(58) Field of Search .......... 73/1.73, 1.59, 73/299, 300, 301, 302; 702/137, 138, 166; 137/597

(56) References Cited

U.S. PATENT DOCUMENTS

| | | | | | |
|---|---|---|---|---|---|
| 2,676,265 | A | * | 4/1954 | Green | 250/43.5 |
| 3,038,336 | A | * | 6/1962 | Peters | 73/299 |
| 3,044,285 | A | * | 7/1962 | Koplin | 68/12.18 |
| 3,161,051 | A | * | 12/1964 | Perry, Jr. | 73/299 |
| 3,330,218 | A | * | 7/1967 | Bumstead | 417/137 |
| 3,765,568 | A | * | 10/1973 | Leifermann | 222/56 |
| 3,790,029 | A | * | 2/1974 | Ward | 222/129.4 |
| 4,043,193 | A | * | 8/1977 | Bailey | 73/155 |
| 4,446,730 | A | * | 5/1984 | Smith | 73/301 |
| 4,522,059 | A | * | 6/1985 | Rodde et al. | 73/223 |
| 4,625,548 | A | * | 12/1986 | Charter | 73/299 |
| 5,014,211 | A | * | 5/1991 | Turner et al. | 700/239 |
| 5,293,891 | A | * | 3/1994 | Cordes et al. | 137/1 |
| 5,319,964 | A | * | 6/1994 | Stephenson et al. | 73/149 |
| 5,406,828 | A | * | 4/1995 | Hunter et al. | 73/4 R |
| 5,564,595 | A | * | 10/1996 | Minissian | 222/59 |
| 5,590,686 | A | | 1/1997 | Prendergast | 137/597 |
| 5,616,838 | A | * | 4/1997 | Preston et al. | 73/195 |
| 6,035,472 | A | * | 3/2000 | Barbe | 8/158 |
| 6,044,694 | A | * | 4/2000 | Anderson et al. | 73/54.41 |
| 6,434,772 | B1 | * | 8/2002 | Barbe | 8/158 |

* cited by examiner

*Primary Examiner*—Hezron Williams
*Assistant Examiner*—Charles Garber
(74) *Attorney, Agent, or Firm*—Olive & Olive, P.A.

(57) ABSTRACT

A system for the operation of a number of commercial washing machines and automatically feeding liquid chemicals to the washing machines. The system has chemical reservoir pods with a pressure sensor and an output valve on each. The chemical pods are supplied with liquid chemical by refill pumps. The quantity of chemical in a chemical pod, and the quantity of chemical dispensed from each chemical pod is calculated from information received by a controller from the pressure sensor to determine when to open and close the valve. A further pressure sensor is provided in the supply pipe to each washing machine to verify and measure flow quantity of water and chemical to the machine.

7 Claims, 9 Drawing Sheets

CHEMICAL DISPENSING SYSTEM

This application is a Divisional Application of application Ser. No. 09/695,114 filed Oct. 24, 2000 now U.S. Pat. No. 6,464,772.

FIELD OF THE INVENTION

The present invention relates to the field of chemical dispensing systems, and more particularly to such systems in which a number of liquid chemicals are dispensed selectively from chemical reservoir pods to a number of washing machines according to wash formula requirements.

BACKGROUND OF THE INVENTION

Commercial and institutional laundry facilities typically employ a plurality of washing machines in an automated system including a plurality of laundry chemical supply stations. The system has a controller which has in memory, or is supplied via an input device a formula for each type of load to be washed. The formula determines the quantity of each laundry chemical, for example detergent, bleach, water treatment, fabric softener, etc., as well as the operating times for each washing cycle. In addition to control of the quantity of each chemical, the formula specifies that the chemicals must be injected in a prescribed sequence and at the proper time for best results. Since commercial and institutional laundries are likely to use relatively large quantities of several chemicals, the accuracy of the quantity delivered is critical both to the quality of the washing results and to the operational efficiency of the laundry plant.

A known system for commercial washing operations is taught in U.S. Pat. No. 5,590,686 to Prendergast, entitled Liquid Delivery Systems. The Prendergast patent teaches the use of a flowmeter to control the amount each chemical that is delivered from its chemical reservoir to the washing machine. The flowmeter is connected to the discharge end of a chemical supply piping system so that chemical flow from any of several chemical reservoirs passes through the flowmeter. The major drawback to the Prendergast device is that a flowmeter is known to have limited accuracy, and in a commercial or institutional laundry system, accurate control of the quantity of each chemical is important. By its nature, a flowmeter is designed and calibrated to measure a liquid of a particular viscosity and at a particular rate of flow. Since there is a single flowmeter in a system dealing with a plurality of chemicals, and since the chemicals generally will have differing viscosities, the amount of any one or several of the chemicals will not be accurately measured. A further drawback of a chemical delivery system that uses a flowmeter to measure chemical delivery quantity is that if the amount of a particular chemical in a reservoir is less than the amount called for by the formula, there is no means to signal an insufficiency before the chemical supply is totally depleted. In this case, either the laundry batch will run with one or more chemicals at lower than the specified quantity or the process will have to be stopped to wait for chemical replenishment.

Therefore, it is an object of the present invention to provide a chemical delivery system capable of achieving accurate control of the quantity of each of a plurality of chemicals from individual sources.

It is an additional object of the invention to verify that sufficient chemical is available for a next wash cycle to run.

These and other objects of the present invention will become apparent through the disclosure of the invention to follow.

SUMMARY OF THE INVENTION

The invention provides a system for automatically dispensing a defined volume of one or more chemicals for use in one or more washing machines. Each chemical is stored in a reservoir pod having a chemical pressure sensor connected adjacent its bottom, a chemical output valve connected into an output pipe, and an overflow sensing switch connected adjacent its top. A single output pump is connected by supply piping between a water supply tank and the washing machines, with each chemical output valve connected to the piping. A diverter valve connects each washing machine with the supply piping. An output pressure sensor is connected between each diverter valve and its respective washing machine.

When a washing cycle is started, a controller requests a selected quantity of each required chemical according to a formula. The controller, through each chemical pressure sensor, verifies that sufficient quantity of each required chemical is available. If insufficient quantity is available, the cycle is suspended until the chemical supply is replenished by activation of a chemical refill pump to refill the deficient pod. If sufficient quantity is available, the single output pump is activated to draw water through the piping, and a diverter valve is set to channel the water to the requesting washing machine, with the output pressure sensor verifying that water is flowing. After a selected quantity of water has entered the washing machine, a first chemical output valve is opened and the chemical flows into the water flow in the piping. The chemical pressure sensor for the pod being accessed sends continuous pressure data to the controller which determines when the selected volume of chemical has been supplied and shuts the chemical output valve. Additional chemicals from other pods are added as required.

The system also includes calibration routines for the pressure sensors and a test routine for verification that power and water are available and the pumps and valves operate properly. A modified system is adapted for use in the supply of chemicals to "tunnel" type-washing equipment.

BRIEF DESCRIPTION OF THE DRAWINGS

In order for the invention to become more clearly understood it will be disclosed in greater detail with reference to the accompanying drawings, in which.

DESCRIPTION OF THE PREFERRED EMBODIMENT

Figure 1:
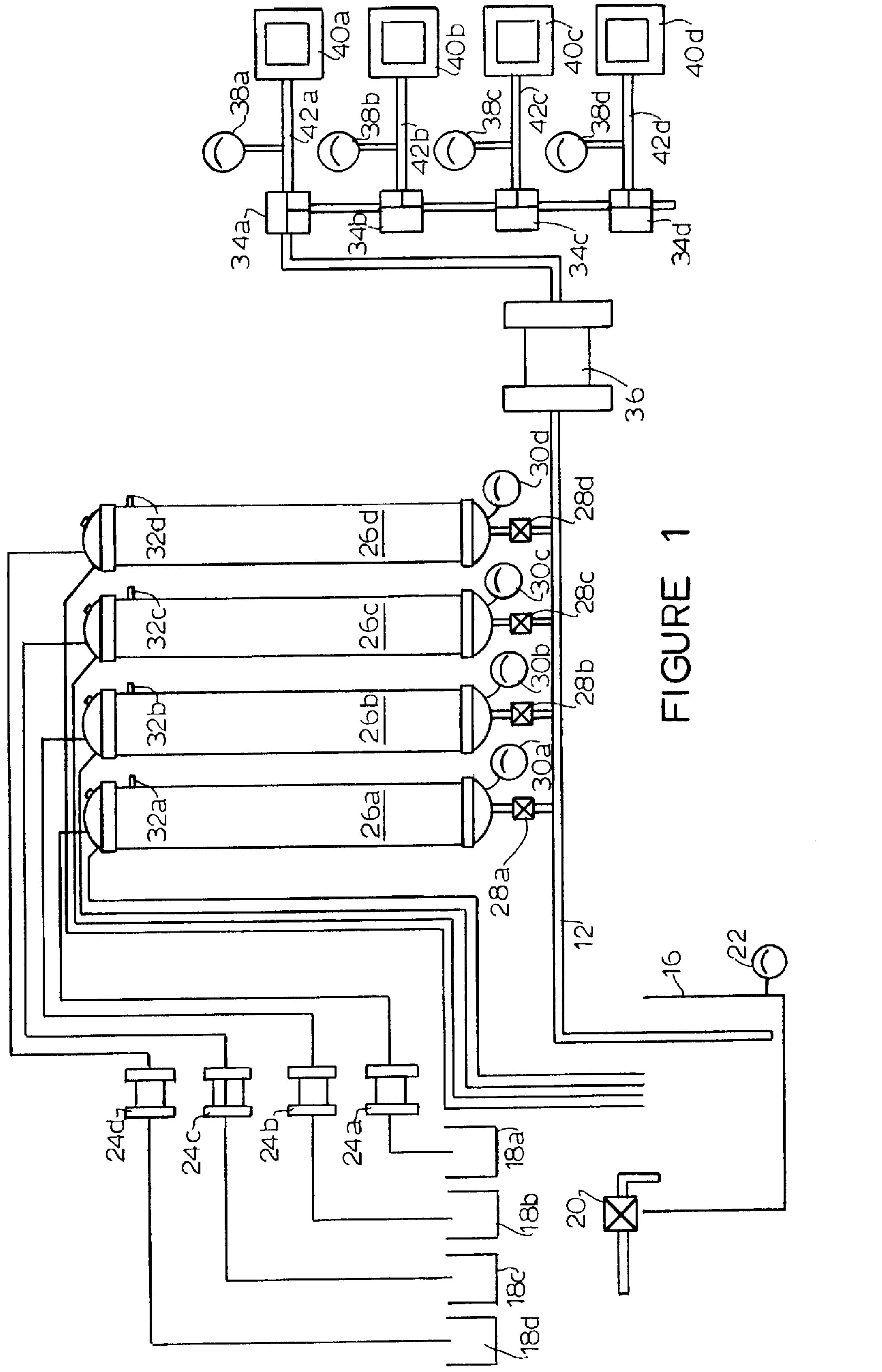
FIG. 1 is a schematic depiction of the chemical dispensing system disclosed as applied to a bank of conventional washing machines.

The chemical dispensing system of the present invention is incorporated into a commercial laundry facility 10 as depicted in FIG. 1. Water is supplied to the system from water supply tank 16 through a supply pipe 12 to a number of process units 40*a*, 40*b*, and 40*c*, e.g., washing machines. An output pump 36 is positioned in supply pipe 12 with its discharge end connected to first 3-way diverter valve 34*a*. One discharge outlet of first 3-way diverter valve 34*a* is connected to first process unit 40*a*, and its second discharge outlet is connected in series fashion to a second 3-way diverter valve 34*b*. Second 3-way diverter valve is similarly connected to second process unit 40*b* and to a third 3-way diverter valve 34*c*. Third 3-way diverter valve 34*c* is connected at one of its discharge outlets to third process unit 40*c* and its other discharge outlet back to water supply tank 16.

While the preferred embodiment of the invention is depicted with three process units and four chemical reservoir pods, differing numbers of process units and chemical pods are within the scope of the invention.

Water supply tank 16 is refilled through a water valve 20 that is actuated when water level sensor 22 signals inadequate quantity of water available in water supply tank 16 to fill at least one washing machine. Water level sensor 22 continuously monitors the amount of water available in tank 16. Water level sensor 22 is, according to the preferred embodiment, a pressure-sensitive transponder such as model MPX5010GP by Motorola. Alternate means of controlling the amount of water available in water supply 16, such as a "float valve," would perform the required basic function. However, it is to be understood that electronic signaling means, such as water level sensor 22 enables chemical dispensing system 10 of the invention to change the required quantity of water in water supply tank 16 by data entry or programming means.

As will be apparent to those skilled in the trade, each pressure sensor, each valve, each pump, and each process unit is in communication with a system controller (not shown) that receives input signals from, and transmits commands to, each such controllable unit. The controller is programmed with a number of formulas, including amounts and types of chemicals to be used, amount of water used, the time in the operation cycle for each liquid to be infused into the process unit, the operation cycle time, etc. The controller also is able to retain in memory pressure sensor values at varied conditions pursuant to a calibration protocol described below.

Output pressure sensors 38*a*–38*c* are respectively connected to each connective delivery pipe 42*a*–42*c* between 3-way diverter valves 34*a*–34*c* and process units 40*a* 40*c*. When output pump 36 operates, and first 3-way diverter valve 34*a* is set to pass liquid through to second 3-way valve 34*b*, for example, with second 3-way valve set to divert liquid passing therethrough to second process unit 40*b*, output pressure sensor 38*b* senses the liquid pressure in delivery pipe 42*b*. If the sensed liquid pressure is outside of an established range, the system controller shuts down the system and activates an alarm as described more fully below. With the sensed liquid pressure in the established range, output pump 36 operates for a time computed at the sensed pressure to deliver the required amount of water to the requesting process unit. At the end of the computed time, output pump 36 is stopped.

Each chemical pod 26*a*–26*d* has a respective chemical pressure sensor 30*a*–30*d* connected adjacent its lower end. Chemical pressure sensors 30*a*–30*d* are, according to the preferred embodiment, a pressure-sensitive transponder, for example Motorola model MPX5050GP. Chemical pressure sensors 30*a*–30*d* continually monitor the pressure as caused by the height and specific gravity of the liquid within each chemical reservoir pod 26*a*–26*b* and send a signal thereof to the system controller. According to the preferred embodiment, each chemical pod 26*a*–26*d* is similar in height, with the diameter, and thus the volume, of each pod differing according to the relative consumption per washing batch of the chemical stored therein. In other words, a chemical pod that is to store detergent, which is used in relatively large amounts, would have a greater diameter than a chemical pod that is to store, e.g., fabric softener. Thus, each chemical pod can be sized to contain, e.g., the amount of chemical that will be required to process two or three batches in one process unit 40. In order to enhance the accuracy of the volumetric measurements derived from each chemical pressure sensor 30, the height of each chemical pod is preferred to be as great as practical. If a pressure sensed by one of chemical pressure sensors 30*a*–30*d* corresponds to a chemical volume that is below an established minimum, the system controller activates the respective chemical refill pump 24*a*–24*d* which operates to refill the respective chemical pod 26*a*–26*d* from the appropriate chemical supply 18*a*–18*d*. The controller will not start a wash cycle until all chemicals are available in adequate supply. The operating chemical refill pump 24 is stopped when the respective chemical pressure sensor 30 indicates that chemical pod 26 is substantially full. An overflow switch 32*a*–32*d* is provided in each tank as a failsafe to stop the operating refill pump 24 in the case that the chemical pressure sensor 30 signal did not deactivate the refill pump 24. Pods 26*a*–26*d* each have a vent hole in the upper end thereof to avoid pressure differentials due to air entrapment. Chemical refill pumps 24 and output pump 36 are preferably of the air-actuated diaphragm type. Chemical output valves 28 are also preferably of the air-actuated type. Three way diverter valves 34 are preferably electrically actuated.

At a preset time after output pump 36 is activated and water is flowing through supply pipe 12 to a requesting process unit 40, a first chemical output valve 28*a*–28*d* is opened to allow the chemical stored in the respective chemical pod 26*a*–26*d* to flow into supply pipe 12. The water flowing in supply pipe 12 carries the chemical through output pump 36 to the requesting process unit. If more than one chemical is being requested and the chemicals are not incompatible, more than one chemical output valve 28*a*–28*d* is opened simultaneously. Otherwise each chemical output valve 28*a*–28*d* is operated in sequence. Each of the operating chemical output valves 28*a*–28*d* remains open until the system controller determines from signals received from the respective chemical pressure sensor 30*a*–30*d* that the requested volume of chemical has entered supply pipe 12, and then the chemical output valve 28*a*–28*d* is closed.

When the operating process unit 40*a*–40*c*, i.e. washing machine, has completed its cycle, it discharges the used water to an available drain (not shown).

Figure 2:
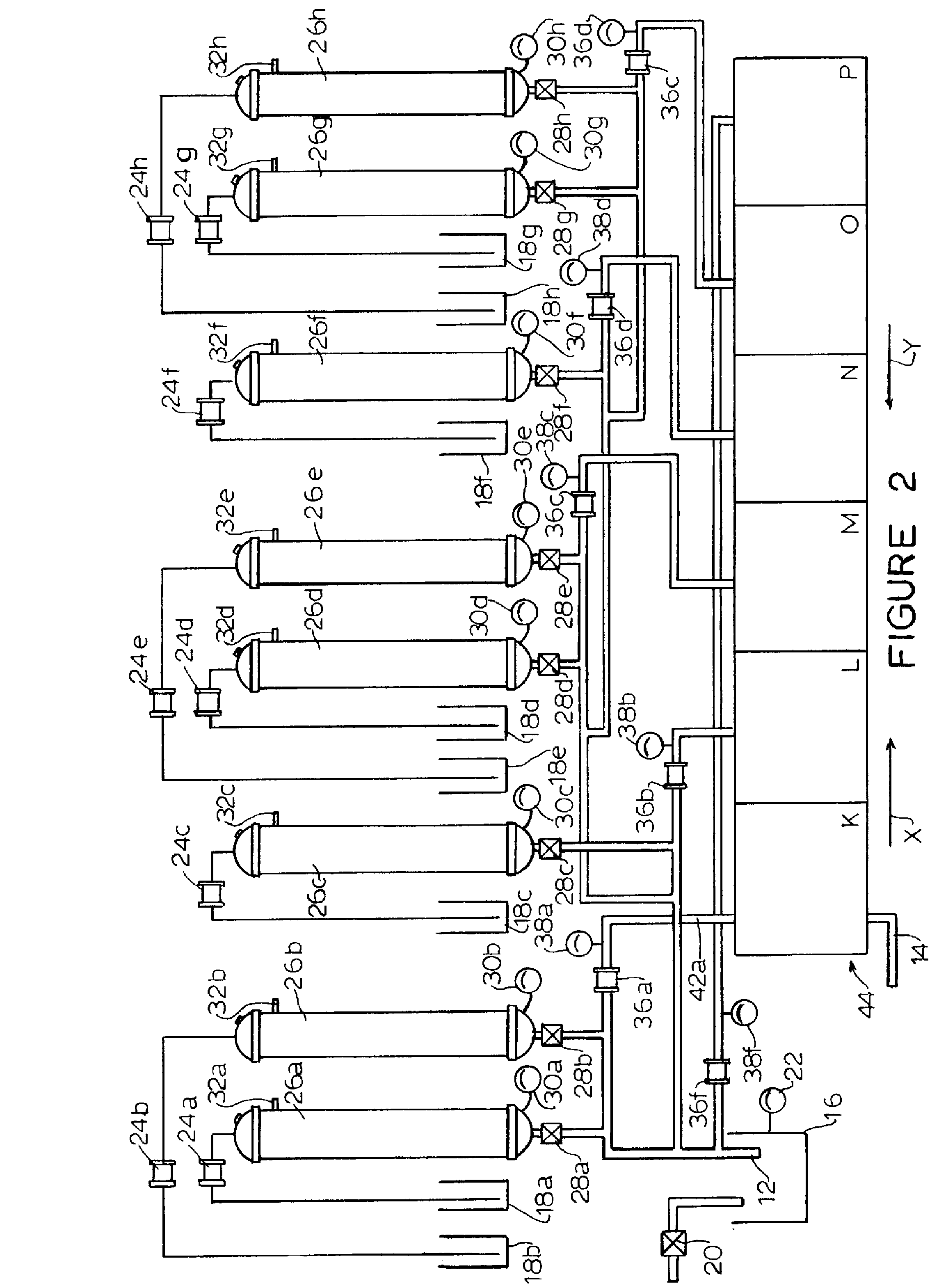
FIG. 2 is a schematic depiction of the chemical dispensing system disclosed as applied to a batch conveyor, or tunnel, washing machines.

A second known industrial washing machine is of the continuous process type, also known as a "tunnel" washing machine, as schematically illustrated in FIG. 2. In this type washing machine, the garments or other materials to be washed are placed in a first end of a long, tubular, apparatus having a series of segments. The tube normally is already filled with water. Required chemicals are added to the water in each segment according to the operation to be done. The garments are agitated with the water and chemicals for a set time and then moved to a second segment. Each segment of a tunnel washer is supplied with additional chemicals as required and additional water to move the chemicals through the supply lines. When the garments arrive at the last segment of the machine, the water is comparatively clean, as are the garments. The clean garments are removed from the last segment and are dried in a separate machine operation, for example a tumble dryer.

Referring now to FIG. 2, the inventive chemical dispensing system as described above is illustrated in an alternate embodiment for use with a continuous process tunnel washer 44. Tunnel washer 44 comprises operating segments K, L, M, N, O, and P. Garments or other items for cleaning are placed first into segment K and are moved sequentially in the direction indicated by arrow X toward segment P. The primary water supply to tunnel washer 44 enters segment P through supply pipe 12' and the water flows in the direction indicated by arrow Y toward segment K. In this manner, the cleanest water is in contact with the cleanest items being processed, i.e., in segment P. Conversely, the dirtiest items enter segment K and are treated initially in comparatively dirty water.

The washing of clothes in tunnel washer 44 involves introducing cleaning chemicals in sequential steps that parallel the movement through washer 44 of items being washed. The apparatus schematically illustrated in FIG. 2 and described below relates to a particular embodiment and is not considered a limitation on the scope of the invention. Upon starting the washing process in tunnel washer 44, after garments or other items and process water are placed into segment K, output pump 36*a* is activated and chemical supply valves 28*a* and 28*b* are opened. Output pressure sensor 38*a* ascertains that liquid flow in delivery pipe 42*a* is occurring. Once chemical pressure sensors 30*a* and 30*b* have ascertained through the system controller (not shown) that sufficient quantity of each of the requested chemicals has been supplied, output pump 36*a* is set to operate for a further time interval to clear delivery pipe 42*a* of residual chemicals.

A similar process to that described above with respect to segment K and associated output pump, chemical reservoir pod, valve, and pressure sensors takes place simultaneously in respect to segments L, M, N, and O. Once the first batch of items to be washed is passed from segment K to segment L, a second batch is placed in segment K, and so forth for segments M, N, O, and P. Each segment of tunnel washer 44 may have a different number of chemical reservoir pods 26, according to the process to be done in that segment. As segment P is the final processing segment in tunnel washer 44, no chemicals are employed and the items that were washed are now merely rinsed with clear water.

The operation of the apparatus of the invention is best understood with reference to FIGS. 3–7. FIGS. 3–7 are principally directed to the invention as it pertains to a number of conventional washer units, but will be understood to relate similarly to a tunnel washer with minor modifications. FIGS. 3–7 illustrate, by way of flowcharts, a group of software sub-routines that are incorporated within the invention program.

Figure 3:
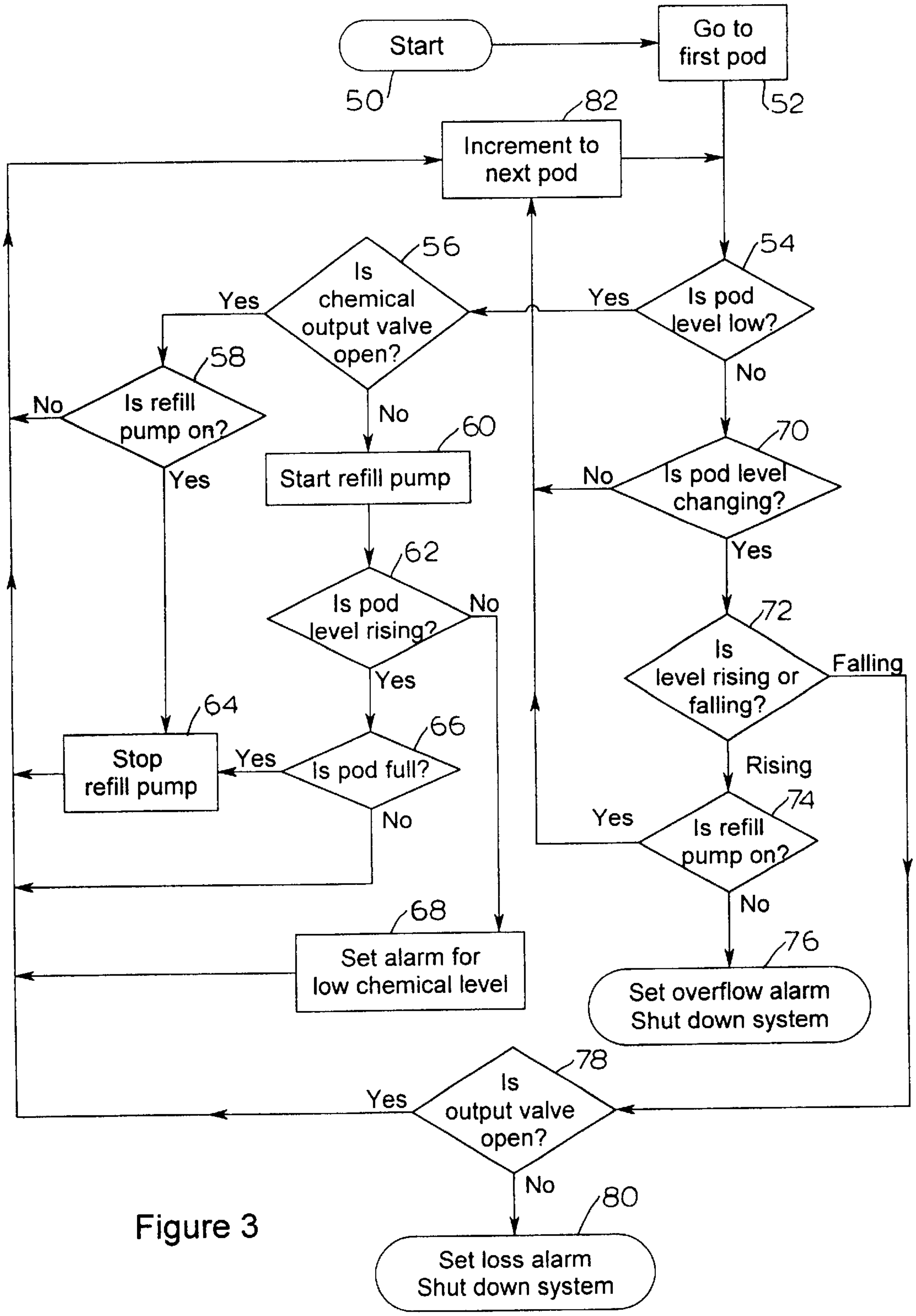
FIG. 3 is a flowchart of the chemical reservoir pod refilling process according to the invention.

FIG. 3 shows a diagrammatic flowchart of a process for validating the function of and refilling the chemical storage pods as described above in relation to the apparatus employed in the practice of the invention. The operation is started at step 50 and moves to the first pod (26*a* of FIG. 1) in step 52. The system then checks the pressure sensor (30*a* of FIG. 1) to determine in Step 54 if the level of chemical in this pod is low. As noted above, the system controller (not shown) computes the volume of chemical in each chemical pod 26 (FIG. 1) based on the reading of the respective chemical pressure sensor 30. If the reading of this chemical pressure sensor is low, the system checks at step 56 whether the respective chemical output valve (28 of FIG. 1) is open. If the chemical output valve is open, the system checks at step 58 if the respective refill pump is on, and if so, stops the refill pump at step 64. If the refill pump is not on at step 58, or if the refill pump was on and was turned off at step 64, the process goes to step 82 which increments to the next chemical reservoir pod. At step 56, if the chemical output valve was not open, the respective refill pump is started at step 60, after which the connected chemical pressure sensor is checked to determine at step 62 if the level of liquid in the chemical reservoir pod is rising. If the level of liquid is rising, the controller determines whether the chemical pod is full at step 66. If the chemical pod is full, the pump is stopped at step 64 and the process goes to the next pod at step 82. If the level of liquid is determined at step 62 not to be rising, an alarm is activated at step 68 showing that the chemical product supply is low and the process goes to step 82.

If the controller determines at step 54 that the pod level is not low, a determination is made at step 70 of whether the level in the chemical pod is changing. If the level is not changing, the process goes to step 82. If the level is changing, the determination is made at step 72 of whether the level is rising or falling. If the level is rising, the system checks whether the respective refill pump is operating at step 74. If the pump is on, the process goes to step 82. If the pump is off, an overflow alarm is set and the system is shut down at step 76. If, at step 72, the level of liquid in a chemical pod was found to be falling, a determination is made as to whether the output valve is open at step 78. If the output valve is open, the process goes to step 82. If the output valve is not open, an alarm indicating liquid loss is set and the system is shut down in step 80.

Figure 4:
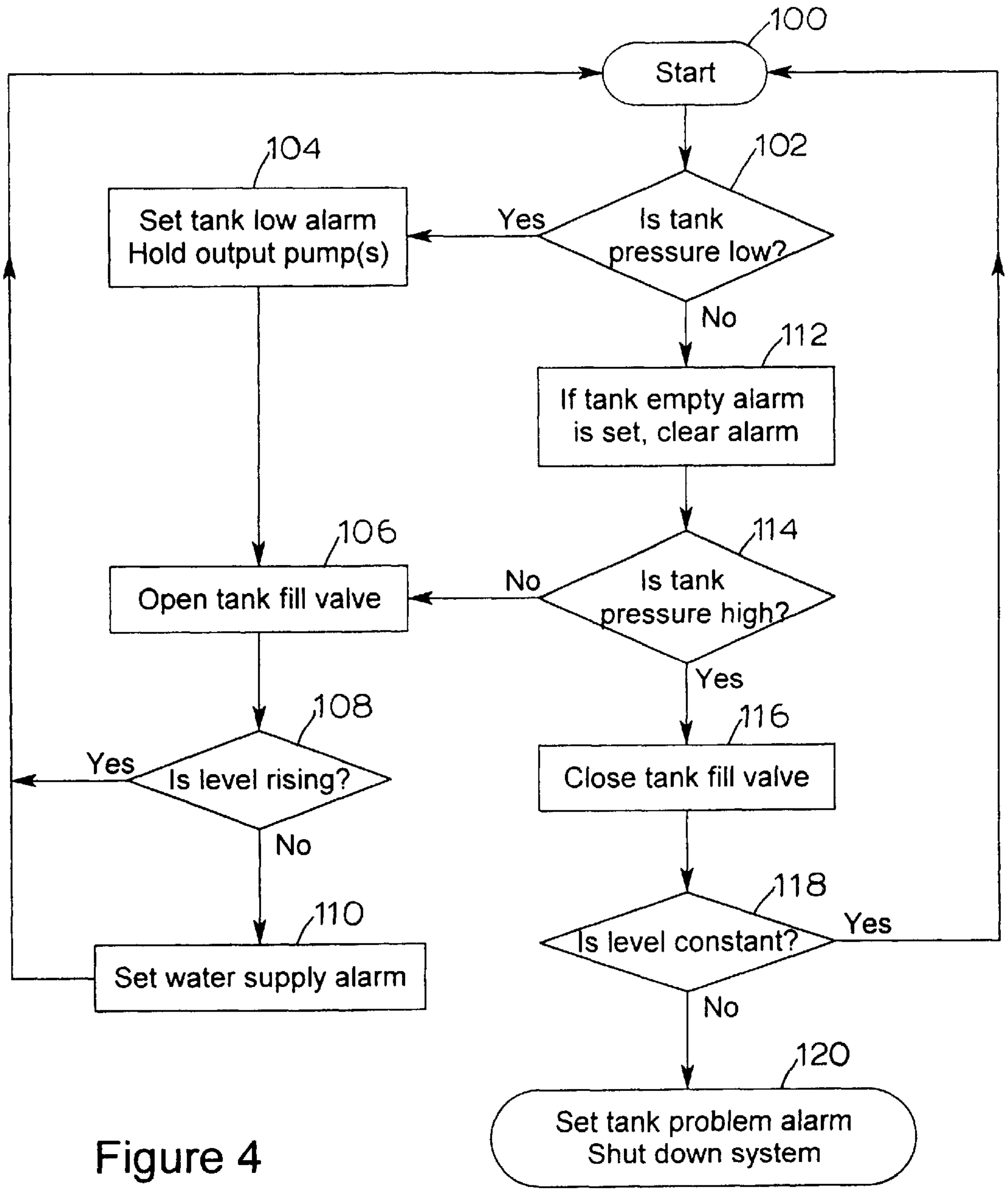
FIG. 4 is a flowchart of the water tank refilling process of the invention.

Referring now to FIG. 4, a sub-routine for verifying and maintaining the level of water in the water supply is shown. The program is started at step 100 and checks whether the pressure in the tank, as indicated by the water pressure sensor (22 of FIG. 1), is low at step 102. If the pressure is below a set minimum, an alarm is set at step 104 to indicate the tank is low and the output pump is not permitted to operate. The tank-filling valve (20 of FIG. 1) is opened at step 106, and a determination whether the water level in the tank is rising is made at step 108. If the level is rising, the process returns to step 100. If the level is not rising, an alarm is set at step 110 to indicate that the water supply is not functioning. If the query at step 102 indicates that the tank pressure is not low, the tank empty alarm, if set, is deactivated at step 112. At step 114, it is determined whether the water pressure is high. If the water pressure is not above a set maximum, the tank-filling valve is opened at step 106, and the sequence through steps 108 and 110 is executed. If the water pressure is at or above the maximum, the tank-filling valve is closed at step 116 and a determination of whether the tank water level is constant is made at step 118. If the water level is constant, the process returns to step 100. If the water level is not constant, an alarm is set at step 120 to show an overflow and the system is shut down.

Figure 5A:
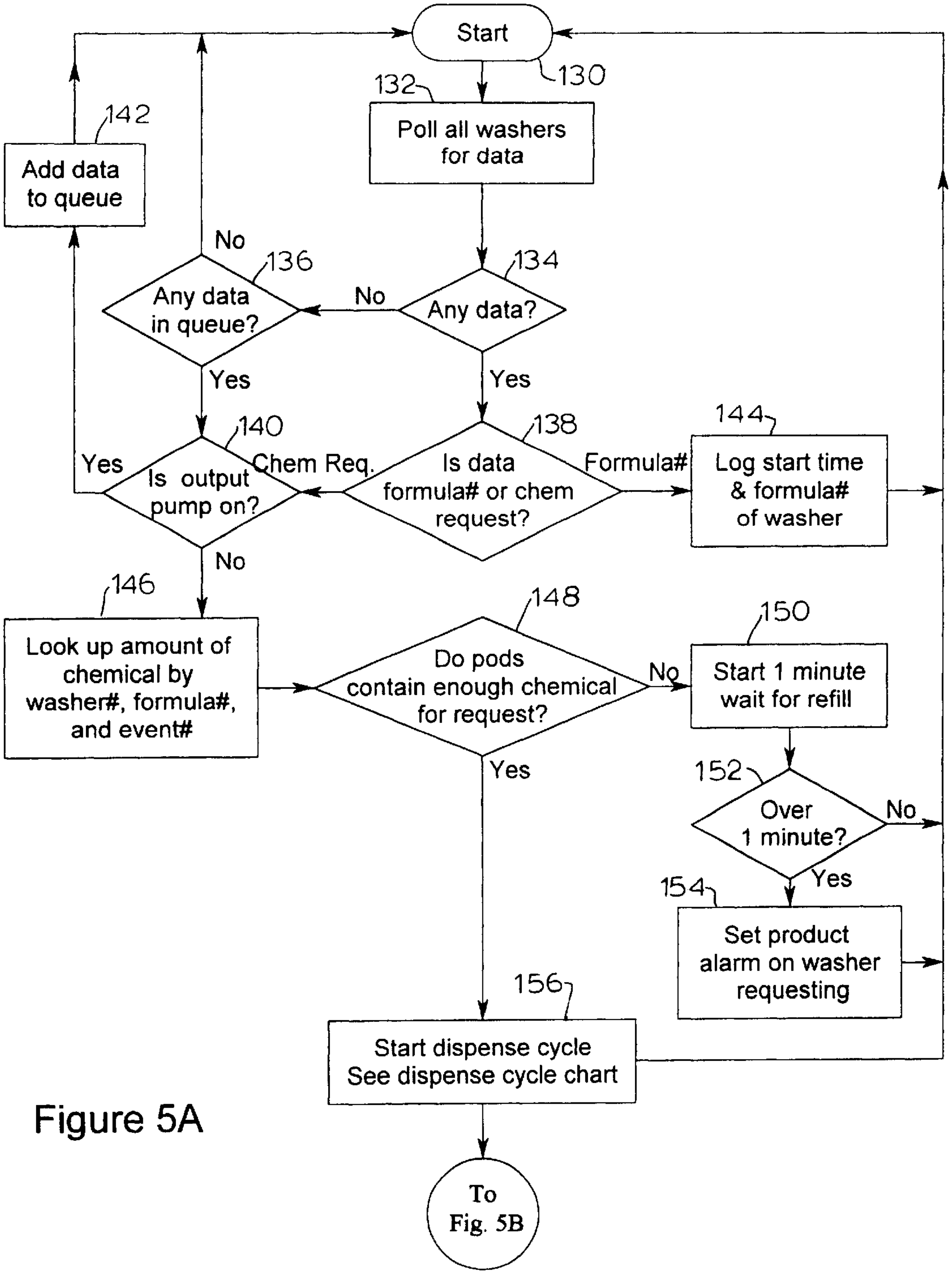
FIGS. 5*a* and 5*b* comprise a flowchart of the chemical dispensing process of the invention.
Figure 5B:
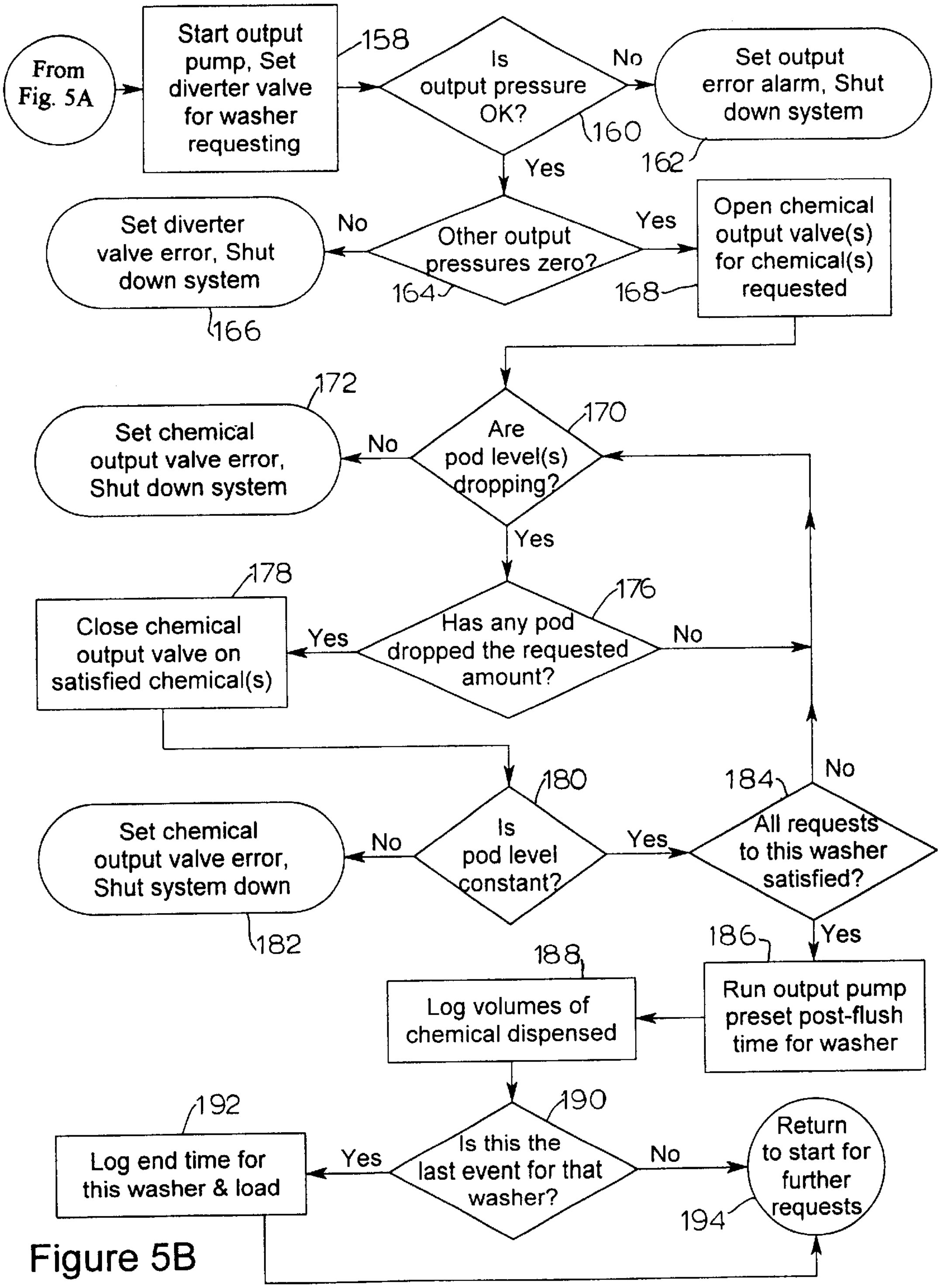
Figure 6:
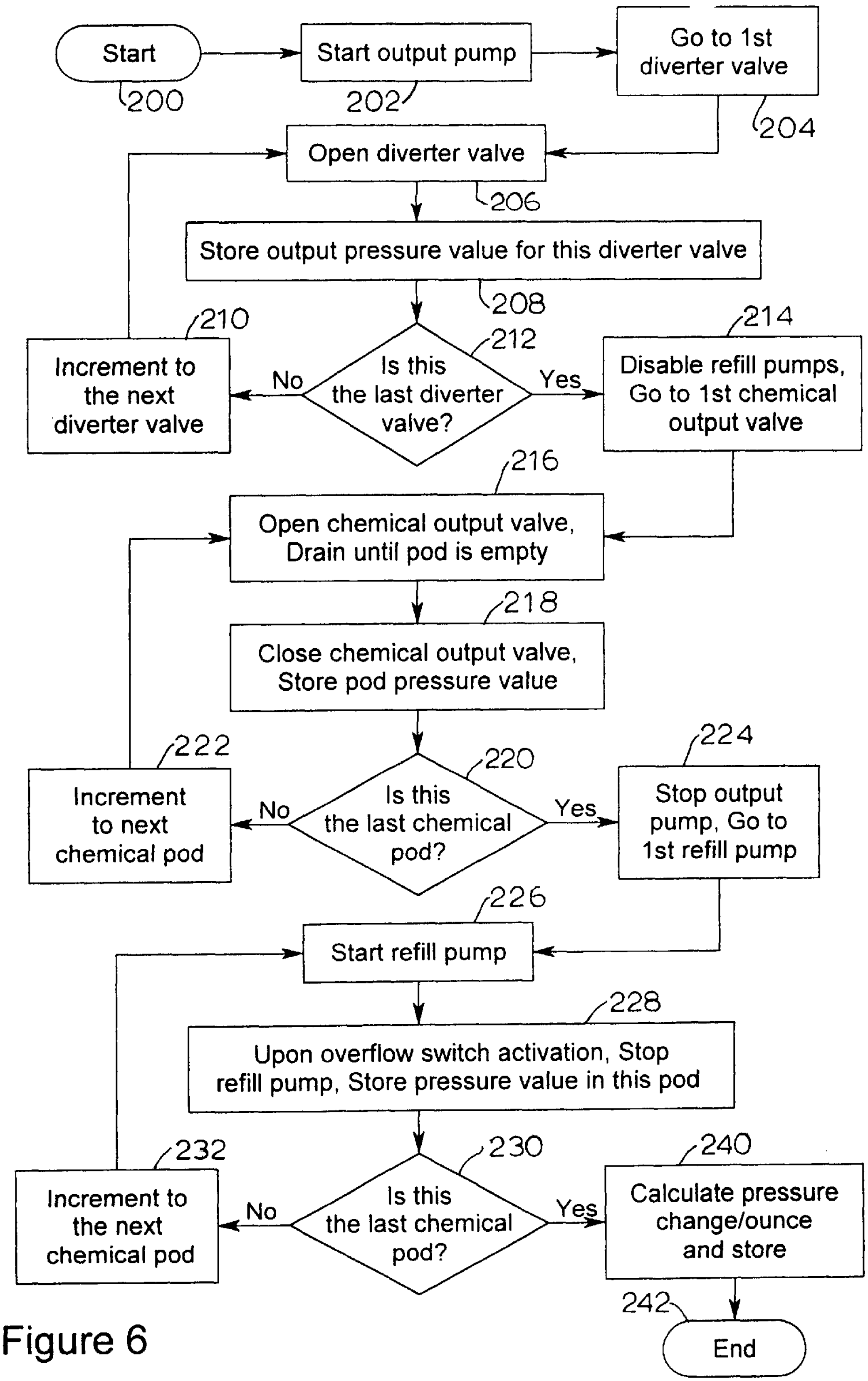
FIG. 6 is a flowchart of a calibration routine of the invention.

A flowchart for the dispensing of requested chemicals is provided in FIGS. 5A and 5B. Beginning with FIG. 5A, the system starts at step 130, then moves to step 132 to poll all process units (40 of FIG. 1) for data, the determination of such data being made at step 134. If there are no data from the units, a determination is made at step 136 whether there are any data in the system queue. If there are no data in the queue, the process returns to step 130. If there were data at the units as determined at step 134, step 138 determines whether the data is a formula number or a chemical request. If the data is a chemical request, a determination of whether the output pump is on is made at step 140. If there were data in the queue, as determined at step 136, a determination of whether the output pump is on is made at step 140. If the output pump is on as found in step 140, the data is added to the queue at step 142. If the output pump is not on, an amount of chemical requested is looked up according to the specific formula, washer, and event at step 146. The amount of each chemical required for the formula, washer, and event is compared to the amount in each chemical pod to determine if each pod (26 of FIG. 1) has enough chemical is made at step 148. If there is enough chemical in each pod to fulfill the chemical requirement, the chemical dispensing cycle is started at step 156 and the process returns to step 130. If there is not enough chemical in any one pod, the system waits one minute at step 150. At a checkpoint whether one minute has passed at step 152, if not, the process returns to step 130. If one minute has passed and the chemical quantity is still inadequate, the chemical product alarm on the requesting washer is set at step 154 and the process returns to start at 130.

Referring now to FIG. 5B, after the dispensing cycle has been initiated at step 156 in FIG. 5A, the output pump (36 of FIG. 1) is started and the diverter valve (34 of FIG. 1) is set for the requesting washer in step 158. The output pressure is checked at output pressure sensor (38 of FIG. 1) in step 160. If output pressure is not acceptable, an output error alarm is set and the system is shut down at step 162. If output pressure is acceptable, a check for zero output pressures at additional diverter valves and pressure sensors is made at step 164. If a non-zero output pressure is sensed at any other pressure sensor, a diverter valve error message is set and the system is shut down at step 166. If all other pressures are sensed as zero, the appropriate chemical output valve(s) (28 in FIG. 1) is (are) opened at step 168. Chemical pod level consistency is checked at step 170 through chemical pressure sensors (30 if FIG. 1). If levels of chemicals are not dropping, a chemical output valve error is set and the system is shut down at step 172. If levels are dropping, step 176 checks if the level of chemical in each of the pods has dropped by the requested amount. If sufficient drop of chemical level has not occurred, the system loops back to step 170. If sufficient drop has occurred, the respective chemical output valve(s) is (are) closed at step 178. Pod pressure is again checked for constant level at step 180. If chemical level is changing, a chemical output valve error is set at step 182 and the system is shut down. If chemical level is constant, a determination is made as to whether all chemical requests for the requesting washer have been satisfied at step 184. If all requests have not been satisfied, the system loops back to step 170. If all requests have been satisfied, the output pump (36 in FIG. 1) continues to run for a preset time to post-flush the system piping at step 186 and the volumes of chemical(s) dispensed is (are) logged at step 188. The system queries whether this is the last event for the requesting washer at step 190. If yes, the end time is recorded at step 192 and the system recycles to start. If not, the system recycles at step 194 to start.

In order to maintain the desired proportions of chemicals, both for quality of results and for economy of use, the present invention provides a protocol by which calibration is accomplished. The calibration routine shown in FIG. 6 compensates for sensor and pump variations as well as for variations in the specific gravity of chemicals from batch to batch. The calibration routine starts at step 200, with the output pump (36 in FIG. 1) started at step 202 and the first diverter valve (34 in FIG. 1) accessed at step 204 and the diverter opened at step 206. The pressure sensor (38 of FIG. 1) value is stored in the controller at step 208 and the system determines whether this is the last diverter valve at step 212. If not, the next diverter valve is accessed in step 210. If the last diverter valve has been checked, chemical refill pumps (24 in FIG. 1) are disabled at step 214 and a first chemical output valve is opened at step 216 and the pod is emptied. The system determines that a pod is empty when the pressure sensed at the output pressure sensor drops, precipitously because no liquid chemical remains at chemical output valve 28 (FIG. 1) and air enters the pod through the vent hole in the top of pod 26. The chemical output valve is closed and the pod pressure is recorded at step 218. The determination of whether this is the last chemical pod is made at step 220. If no, the system increments to the next pod at step 222 and loops back to step 216. If yes and all pods are empty, the output pump is stopped in step 224 and the system goes to the first chemical refill pump, which is started in step 226. The refill pump operates until the overflow switch (32 in FIG. 1) is activated in step 228, the refill pump is stopped, and the pressure value is recorded. Whether this is the last chemical pod is determined at step 230. If no, the system moves to the next pod in step 232 and loops back to step 226. If yes, the pressure change per ounce, based on the volume of the pod and the pod empty and pod full pressure values, is calculated at step 240 for all pods and the calibration routine is stopped at step 242.

Figure 7A:
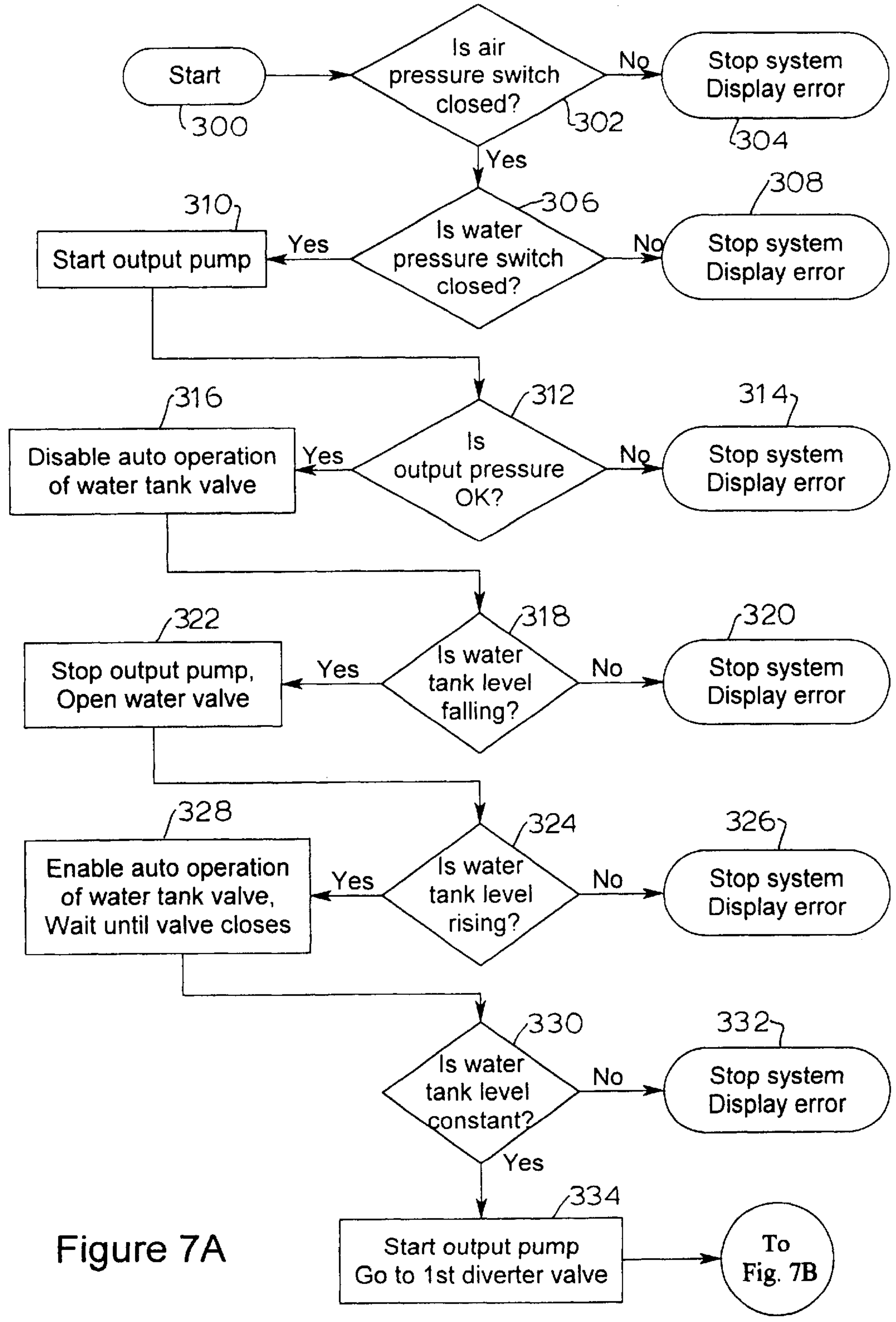
FIGS. 7*a* and 7*b* comprise a flowchart of a diagnostic routine for the apparatus of the invention.
Figure 7B:
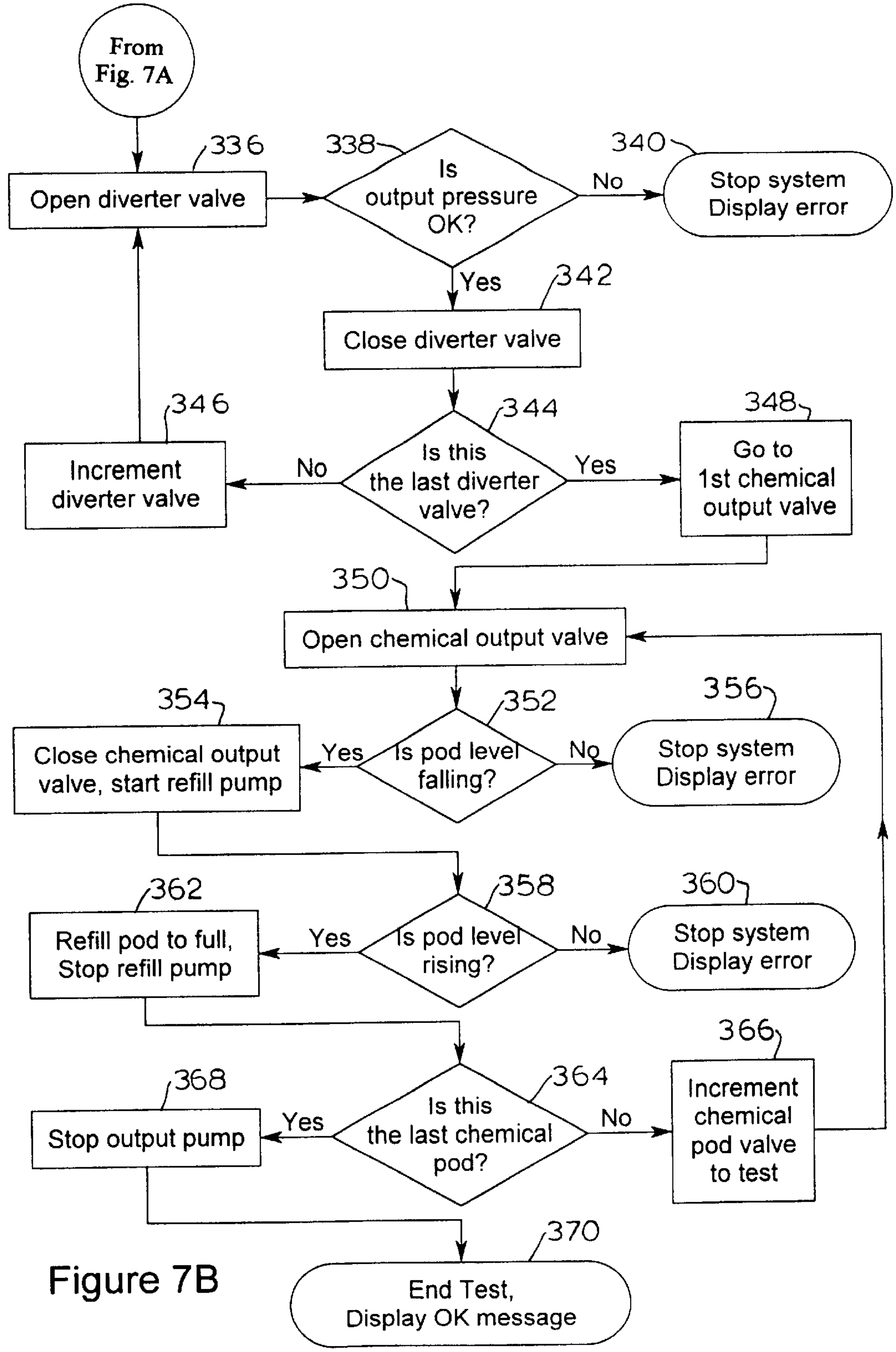

Further to the capacity of the system to operate according to specifications is its ability to periodically verify that each of the critical components is operating, for which a self testing protocol is provided as shown in flowchart form in FIGS. 7A and 7B. The system is started at step 300 and a determination is made of whether the air pressure switch, for verification of air pressure needed for air-actuated pumps and values, is closed is made in step 302. If no, the system is stopped and an error displayed in step 304. If yes, a determination of whether the water pressure switch, for verification of water supply, is closed is made in step 306. If no, the system is stopped and an error displayed in step 308. If yes, the output pump (36 of FIG. 1) is started in step 310, and a determination of whether the output pressure is within limits is made in step 312. If no, the system is stopped and an error displayed in step 314. If yes, the water tank refill valve is disabled in step 316, and a determination of whether the water tank level is falling is made in step 318. If no, the system is stopped and an error displayed in step 320. If yes, the output pump is stopped and the water tank refill valve (20 of FIG. 1) is opened in step 322. A determination of whether the water tank level is rising is made in step 324. If no, the system is stopped and an error displayed in step 326. If yes, the water tank refill valve automatic operation is reactivated and the system waits for the valve to close in step 328. The system then determines whether the water tank level is constant in step 330. If no, the system is stopped and an error displayed in step 332. If yes, the output pump is started and the system moves to the first diverter valve (34*a* of FIG. 1) in step 334, which is opened in step 336. A determination as to whether the pressure is adequate is made in step 338. If no, the system is stopped and an error displayed in step 340. If yes, the first diverter valve is closed in step 342, and the system determines whether this is the last diverter valve in step 344. If no, the system moves to the next diverter valve in step 346 and returns to step 336. If yes, the system moves to the first chemical output valve (28*a* in FIG. 1) in step 348 and opens the valve in step 350. A determination is made whether the chemical pod (26 of FIG.

1) level is falling. If no, the system is stopped and an error displayed in step 356. If yes, the chemical output valve is closed and the refill pump (24*a* of FIG. 1) is started in step 354. A determination of whether the pod level is rising is made in step 358. If no, the system is stopped and an error displayed in step 360. If yes, the refill pump is stopped once the pod is full in step 362. A determination is made of whether this is the last chemical pod in step 364. If no, the system moves to the next chemical pod in step 366 and returns to step 350. If yes, the output pump is stopped in step 368 and the test is terminated in step 370.

The above detailed description of a preferred embodiment of the invention sets forth the best mode contemplated by the inventor for carrying out the invention at the time of filing this application and is provided by way of example and not as a limitation. Accordingly, various modifications and variations obvious to a person of ordinary skill in the art to which it pertains are deemed to lie within the scope and spirit of the invention as set forth in the following claims.

What is claimed is:

1. A method for dispensing a defined volume of chemical and water to a first process unit that makes use of such chemical and water in its operation, comprising the steps:

(a) establishing a system adapted to practice such method, said system comprising:

(i) a first container of known volume and uniform cross-sectional area for holding a first supply of said chemical;

(ii) a second container for holding a second replenishment supply of said chemical;

(iii) a third container for holding a contained supply of said water and connected through a remotely controllable water valve to a larger supply of said water;

(iv) a first stationary sensing means mounted proximate the bottom of said first container and operative to continuously measure and produce a first signal corresponding to the pressure at the bottom of said first container as an indicator of the level of said chemical in said first container;

(v) a second sensing means mounted proximate the top of said first container and operative to create a second signal indicative of said first container being full;

(vi) a third sensing means mounted on said third container and operative to create a third signal indicative of the level of water in said third container;

(vii) a first pipe having an intake end connected to said third container and a discharge end connected to said first process unit through a remotely controllable output pump;

(viii) a second pipe connected through a remotely controllable chemical output valve between the bottom of said first container and said first pipe;

(ix) a remotely controllable chemical refill pump connected on its input side to said second container and on its output side to said first container;

(x) a fourth sensing means connected to said first pipe proximate said first process unit and operative to continuously produce a fourth signal corresponding to the pressure in said first pipe at said first process unit;

(xi) a controller communicating with each said first, second, third and fourth sensing means, chemical output valve, output pump, and chemical refill pump and operable to receive input signals from and transmit commands to each said sensing means, valve, and pump and having programmed formulas, including amount of chemical and water to be used, the time for each liquid to be infused into said first process unit, and having in memory pressure sensor values at varied conditions pursuant to a calibration protocol, whereby:

(1) said output pump operates for such time needed to verify that said fourth signal from said fourth sensing means connected to said first pipe are within a given range appropriate for the process being performed;

(2) after said output pump has been activated, said chemical output valve is opened to permit said chemical to flow into said first pipe until said controller determines from said first signal received from said first sensing means that the requested volume of said chemical has entered said first pipe and said controller then commands said chemical output valve to close; and (3) said chemical refill pump then operates only when said first sensing means indicates a pressure corresponding to a volume of said chemical in said first container less than adequate for a future requst from said first process unit; and (b) dispensing said volume of chemical and water utilizing said system.

2. The method of claim 1, wherein in said system:

(a) the discharge end of said first pipe is also connected to said first process unit through a first remotely-controllable control valve located downstream of said output pump and upstream of a fifth sensing means and a second process unit and operative to continuously produce a fifth signal corresponding to the pressure in said first pipe at said second process unit; and (b) said output pump operates only when said first control valve is appropriately positioned and when said fourth and fifth sensing means are within a given range.

3. The method of claim 1, wherein in said system said first container is cylindrical and of uniform diameter.

4. The method of claim 2, wherein in said system said first container is cylindrical and of uniform diameter.

5. The method of claim 1, including establishing a calibration factor for said first sensing means utilizing said controller for:

(a) emptying said first container;

(b) confirming that said first container is empty by detecting no change in pressure by said first sensing means over a period of time;

(c) measuring a first pressure asserted by said chemical at the bottom of said first container by utilizing said first sensing means when said first container is empty;

(d) filling said first container with a said chemical;

(e) measuring a second pressure asserted by the chemical at the bottom of said first container by utilizing said first sensing means when said first container is full with said chemical;

(f) calculating the difference between said second and first pressures; and (g) dividing said difference in pressure by the volume of said first container to determine said calibration factor in terms of units of pressure per units of volume;

(h) following establishment of said calibration factor, multiplying said calibration factor by a volume of said chemical desired to be dispensed to determine a calculated pressure corresponding to a volume of said chemical in said first container when full less said desired volume dispensed; and (i) dispensing said chemical until said corresponding pressure is measured by said first sensing means.

6. The method of claim 2, including establishing a calibration factor for said first sensing means by utilizing said controller for:

(a) emptying said first container;

(b) confirming that said first container is empty by detecting no change in pressure by said first sensing means over a period of time;

(c) measuring a first pressure asserted by said chemical at the bottom of said first container by utilizing said first sensing means when said first container is empty;

(d) filling said first container with said chemical;

(e) measuring a second pressure asserted by the chemical at the bottom of said first container by utilizing said first sensing means when said first container is full with said chemical;

(f) calculating the difference between said second and first pressures;

(g) dividing said difference in pressure by the volume of said first container to determine said calibration factor in terms of units of pressure per units of volume;

(h) following establishment of said calibration factor, multiplying said calibration factor by a volume of said chemical desired to be dispensed to determine a calculated pressure corresponding to a volume of said chemical in said first container when full less said desired volume dispensed; and (i) dispensing said chemical until said corresponding pressure is measured by said first sensing means.

7. The method of claim 6, wherein in said system said first container is cylindrical and of uniform diameter.

* * * * *